(12) United States Patent
Bentner et al.

(10) Patent No.: US 8,370,039 B2
(45) Date of Patent: Feb. 5, 2013

(54) ELECTRIC PARKING BRAKE HAVING A CONTROL ELEMENT FOR SWITCHING INTO A SERVICE MODE

(75) Inventors: Johannes Bentner, Pentling (DE); Alexander Kalbeck, Burglengenfeld (DE); Norbert Labermeier, Wenzenbach (DE)

(73) Assignee: Continental Automotive GmbH, Hannover (DE)

( * ) Notice: Subject to any disclaimer, the term of this patent is extended or adjusted under 35 U.S.C. 154(b) by 1129 days.

(21) Appl. No.: 12/293,914

(22) PCT Filed: Jan. 10, 2007

(86) PCT No.: PCT/EP2007/050221
§ 371 (c)(1),
(2), (4) Date: Oct. 14, 2008

(87) PCT Pub. No.: WO2007/107386
PCT Pub. Date: Sep. 27, 2007

(65) Prior Publication Data
US 2009/0227423 A1    Sep. 10, 2009

(30) Foreign Application Priority Data
Mar. 23, 2006 (DE) .......................... 10 2006 013 509

(51) Int. Cl.
*B60L 7/06* (2006.01)
(52) U.S. Cl. .......................................... 701/70; 701/36

(58) Field of Classification Search .................... 701/36, 701/70, 83; 188/156, 157, 158, 159; 303/20
See application file for complete search history.

(56) References Cited

U.S. PATENT DOCUMENTS

| 6,249,737 B1 * | 6/2001 | Zipp ................................ 701/70 |
| 6,402,259 B2 * | 6/2002 | Corio et al. ...................... 303/20 |
| 7,103,465 B2 | 9/2006 | Li .................................... 701/70 |
| 8,112,213 B2 * | 2/2012 | Cahill et al. ..................... 701/70 |

FOREIGN PATENT DOCUMENTS

| DE | 19838886 | 10/1999 |
| DE | 102005031725 | 1/2007 |
| EP | 1595763 | 11/2005 |

OTHER PUBLICATIONS

International Search Report and Written Opinion; PCT/EP2007/050221; pp. 10, Jun. 4, 2007.

* cited by examiner

*Primary Examiner* — Richard M. Camby
(74) *Attorney, Agent, or Firm* — King & Spalding L.L.P.

(57) ABSTRACT

During service and repair work on an electric parking brake (1) of a motor vehicle, there is the problem that, in order to switch into a service mode in which the parking brake (15) can be completely opened, in order for example to be able to exchange a brake cable, a special diagnosis unit must generally be used. A diagnosis unit of this type is however not always available in workshops. It is therefore proposed to carry out the switch into the service mode of the electric parking brake (1) with at least one control element (2,2*a*) of the motor vehicle. Here, it is provided that, for safety reasons and in order to avoid an undesired switch into the service mode, the actuation of the at least one control element (2, 2*a*) must take place according to a predefined input procedure.

20 Claims, 2 Drawing Sheets

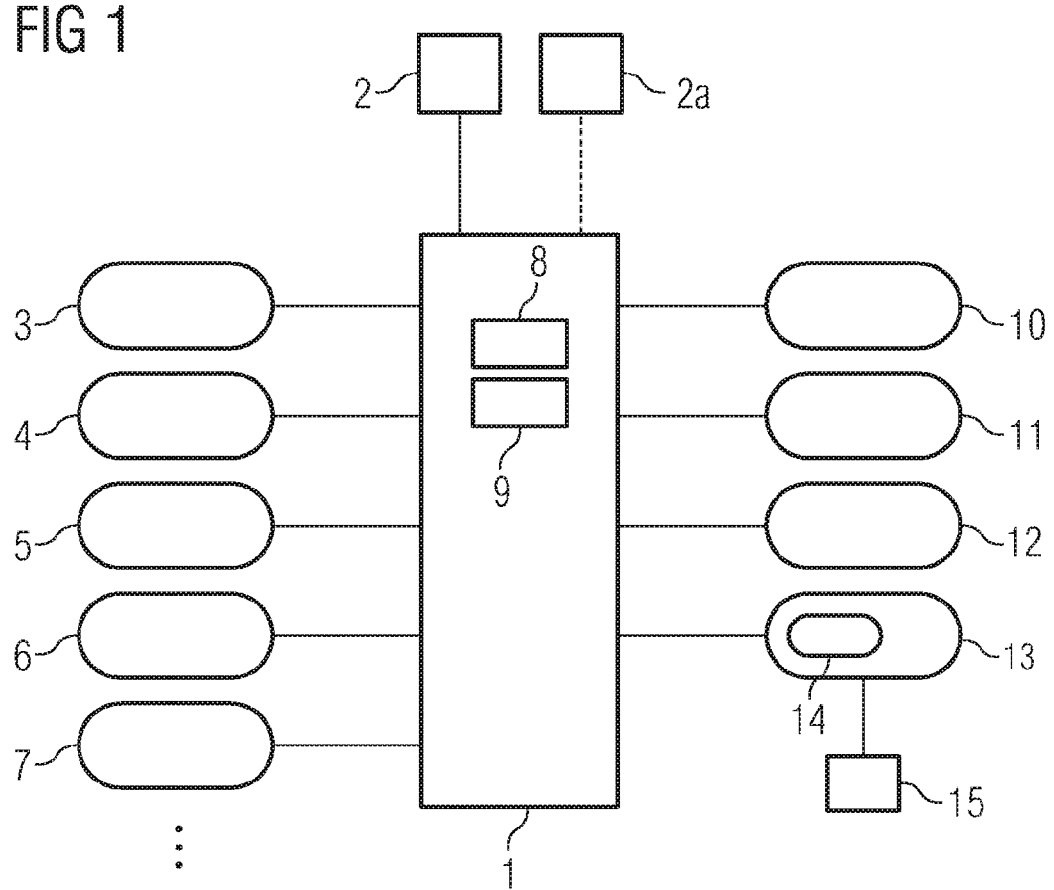

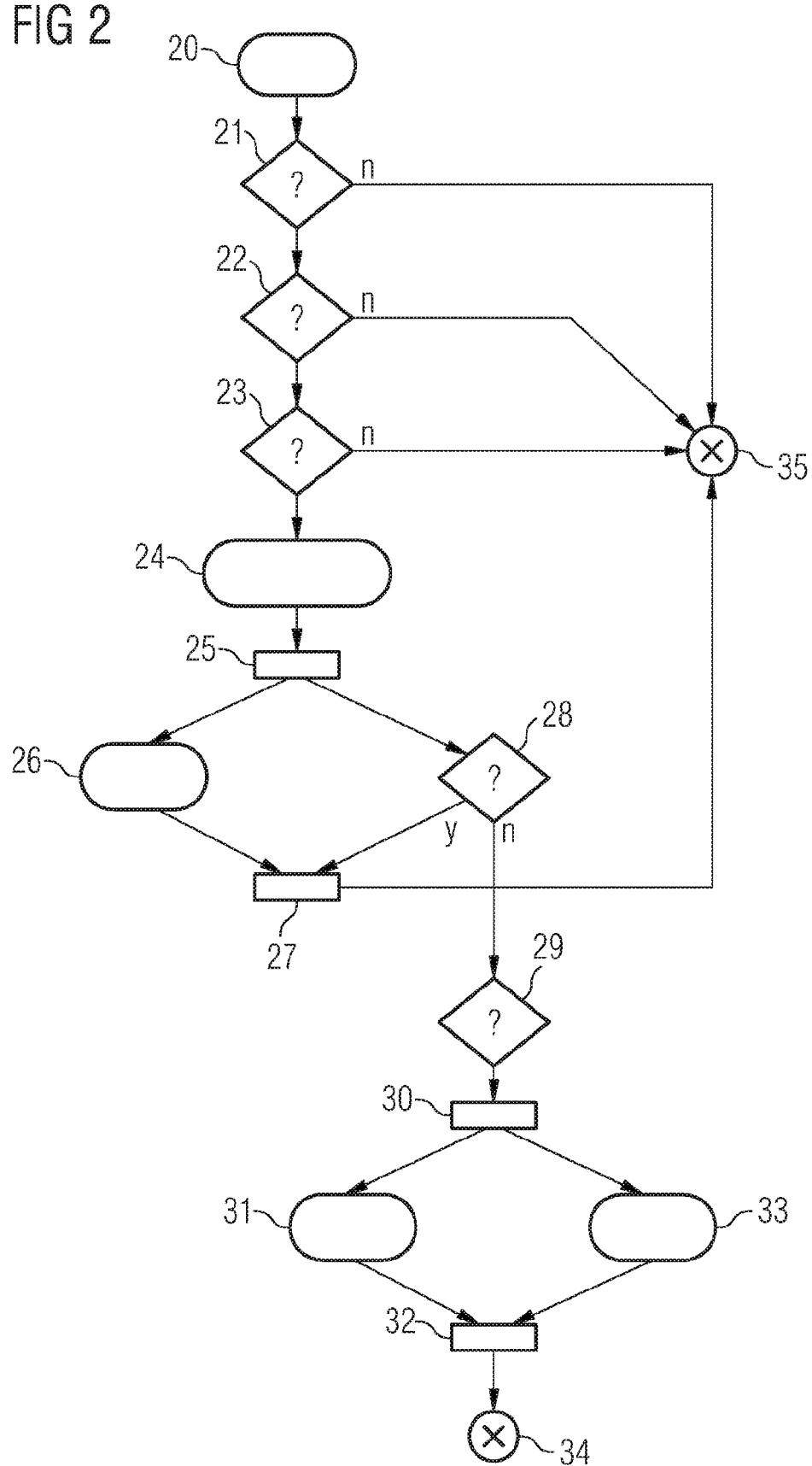

ELECTRIC PARKING BRAKE HAVING A CONTROL ELEMENT FOR SWITCHING INTO A SERVICE MODE

CROSS-REFERENCE TO RELATED APPLICATIONS

This application is a U.S. National Stage Application of International Application No. PCT/EP2007/050221 filed Jan. 10, 2007, which designates the United States of America, and claims priority to German Application No. 10 2006 013 509.1 filed Mar. 23, 2006, the contents of which are hereby incorporated by reference in their entirety.

TECHNICAL FIELD

The invention relates to an electrical parking brake of a motor vehicle, in which in an operational mode at least one actuator applies or releases a parking brake by means of a braking mechanism of at least one wheel brake.

BACKGROUND

With the electrical parking brake, as with a conventional mechanical parking brake, there is the requirement for the mechanical braking system to be able to be maintained, for example the brake cable or also brake pads must be able to be replaced, renewed or adjusted. To this end it is necessary in a service mode to be able to place the parking brake with the aid of a release function into a completely opened position so that no forces act on the brake cable and the brake mechanism. By contrast with a conventional mechanical parking brake, with the electrical parking brake the completely opened position cannot simply be set mechanically. Instead it is necessary to put the electrical parking brake by electrical means with a corresponding release function into the completely opened position in the service mode. For safety reasons the parking brake may only assume this release position in exceptional circumstances if the motor vehicle is stationary and there is no danger of it being able to roll away for example. In this opened position a parking brake is opened so wide that any attached brake cable with which the brake shoes or brake pads of the parking brake are applied, can come loose from its brackets by itself, so that the function of the parking brake becomes ineffective.

It is further known that, to avoid the above-mentioned problems, with a known electrical parking brake the activation of the service mode is only enabled using a secure diagnostic command. The diagnostic command in this case is specified with the aid of an external diagnostic device which must be connected accordingly to the electrical parking brake. Such a diagnostic device generally functions only for a specific motor vehicle of an individual motor vehicle manufacturer and is unlikely to be available to all service workshops. Thus, for cost reasons, only a small proportion of the service workshops will be able to use such a proprietary diagnostic device.

Furthermore it is known that the electrical parking brake cannot simply be put into a completely opened position by mechanical means. This is because the emergency release of the brake mechanism subjects the actuator as well as the drive unit to very great mechanical stresses and can be damaged by this or a fault can be introduced into the braking system which leads to a registered incorrect setting. This incorrect setting cannot be corrected however without the specific diagnostic device. In this case too a corresponding diagnostic device is thus required to be able to reset the electrical parking brake by electrical means back into the functionally correct operating mode.

SUMMARY

According to various embodiments, the switchover at an electrical parking brake for a motor vehicle from an operational mode into a service mode and vice versa can be simplified and designed safely.

According to an embodiment, an electrical parking brake for a motor vehicle may comprise an actuator and a brake mechanism for actuating a parking brake, and in an operational mode the parking brake is operable to be applied or released and in a service mode the parking brake is operable to be put into an opened position, wherein the electrical parking brake is further operable so that the service mode for the electrical parking brake is implemented with at least one control element, and wherein the at least one control element is actuated in accordance with a predetermined input scheme with the aid of a safe combination of input steps.

According to a further embodiment, the switchover can be prepared with a first control element and the switchover can be performed with a second control element. According to a further embodiment, an activation switch of the electrical parking brake, with which the electrical parking brake is actuated in any event, can be used as the sole or further control element. According to a further embodiment, a control device may be operable, on activation of the service mode, to detect a manual actuation of the control elements, to store the service mode and to output the status for the activated service mode as an acoustic and/or optical warning signal. According to a further embodiment, as preparation for the activation of the service mode the control element may be pressed for a minimum time. According to a further embodiment, the switchover into the service mode may only be executed if at least one further vehicle signal was detected simultaneously or within a specific time sequence, especially 'ignition switched on', 'brake pedal is pressed', 'motor vehicle stationary', 'transmission set to the neutral or the park position' or similar. According to a further embodiment, the at least one control element of the vehicle signal generator for activating and/or for deactivating the service mode is to be pressed a number of times, especially within a predetermined time window or at predetermined intervals. According to a further embodiment, for activating and/or deactivating the service mode, a second control element is to be actuated according to a second actuation scheme, preferably within a second time window and/or of an input scheme and/or depending on an operating state of the motor vehicle. According to a further embodiment, the electrical parking brake may be switched back automatically into the operational mode if the input scheme is not adhered to. According to a further embodiment, for activating the electrical parking brake a signal of a signal generator of the motor vehicle, for example a signal of a body controller, especially the headlamp controller, of a window winder, a mirror adjuster etc. can be evaluated, with the signal not having any direct relationship to the function of the electrical parking brake. According to a further embodiment, the switch back into operational mode may be undertaken in accordance with the same input scheme and/or using the same control elements with which the switchover into service mode was made. According to a further embodiment, for switching back from service mode into operational mode the further control element of the motor vehicle is to be pressed for a predetermined minimum time and/or once or several times. According to a further embodiment, the switch back to operational mode may only be undertaken if the transmission of the motor vehicle is set to idle or to park and/or a brake pedal for the service brake is pressed at least once ad subsequently kept pressed. According to a further embodiment, before the switch back from service mode into operational mode, or triggered automatically or manually by the switch back, a calibration of the electrical parking brake is able to be carried out in accordance with a predetermined input scheme.

According to another embodiment, a motor vehicle may comprise such an electrical parking brake, wherein the at least one control element being arranged in or on the motor vehicle.

BRIEF DESCRIPTION OF THE DRAWINGS

An exemplary embodiment of the invention is shown in the drawing and will be explained in greater detail in the description given below.

FIG. 1 shows a block diagram of an inventive electrical parking brake and

FIG. 2 shows a flow diagram for the electrical parking brake shown above.

DETAILED DESCRIPTION

According to various embodiments, for an electrical parking brake for a motor vehicle for the switchover from an operational mode into a service mode only at least one control element, which is especially arranged in or on the motor vehicle, is needed. The control element in this case is activated for the switchover according to a predetermined input scheme. This advantageously may enable an external diagnostic device to be dispensed with. Service work on the electrical parking brake can thus be performed very much more quickly and easily. In particular any specialist workshop can now carry out maintenance and repairs on the electrical parking brake. It may also be seen as especially advantageous that the various embodiments allow practically all types of vehicle and makes of vehicle to be handled without any great extra expense in the specialist workshop.

Various further embodiments provide advantageous developments and improvements of such a electrical parking brake. In particular undesired manipulation of the parking brake is made more difficult if two or more control elements are required for the switchover.

It may also be seen as especially advantageous for an activation switch which is already present in the motor vehicle and is to be used in any event for the actuation of the electrical parking brake to be used as a second control element. This means that an additional control element does not have to be built into the motor vehicle.

According to an embodiment, to increase safety there is provision for a control device, on activation of the service mode, to detect and/or store a manual activation of the control element. The detected and stored information can then be output in a simple manner, as an acoustic and/or optical warning signal for example, on the dashboard of the motor vehicle for example. This enables the driver of the motor vehicle to recognize at a glance that the electrical parking brake of his vehicle is not ready for operation and that he may not use the motor vehicle.

In a further embodiment there is provision for the control element to be pressed for a predetermined minimum time as an input scheme for the activation of the service mode. Furthermore the control device checks whether there is simultaneously at least one further motor vehicle signal present. For example sensors already present in the motor vehicle can be used to monitor whether the ignition is switched on, whether the brake pedal is pressed, whether the transmission setting is in neutral or an automatic transmission is in the park position or similar. This provides an easy method of preventing the motor vehicle still being able to be moved and thus the electrical parking brake not being able to be switched into the service mode at all.

In order to prevent an accidental switchover from operational mode into service mode or vice versa for deactivating the service mode, there is provision for the control elements to be pressed a number of times, especially within a predetermined time window and/or at predetermined intervals, for example in accordance with a specific control scheme.

A further safeguard against accidental switchover of the electrical parking brake to prevent it being put into the service mode is provided by a second control element having to be actuated in accordance with a second activation scheme. The second actuation scheme can in such cases be actuated within a second time window and/or as a function of an operating state of the motor vehicle.

With a more complex input scheme unauthorized persons can also be prevented from deliberately being able to manipulate the electrical parking brake. In this way the safe functioning of the electrical parking brake can be improved in a very simple manner.

There is also provision, to improve the road safety, for the electrical parking brake to be switched automatically into operating mode if the predetermined input scheme is not adhered to, when for example a defined period of time is exceeded without any input having taken place.

There is provision for the control element or a further control element of the motor vehicle to be used once again to switch back from service mode into operational mode. This control element can in this case be pressed once or several times for a predetermined minimum duration within a specific control mode. This ensures that the service mode is not able to be deliberately switched back if for example the service work on the braking system has not yet been completed.

Furthermore, according to various embodiments, there is provision for safety reasons for the switching back into the operating mode only to take place if the transmission of the motor vehicle is in neutral or is set to park and/or the brake pedal for the service brake is pressed at least once and subsequently kept pressed. To further enhance safety there is also provision for a sensor signal of the motor vehicle to be used for activation of the electrical parking brake. For example signals from vehicle facilities such as the headlight setting, a window winder, the mirror adjustment etc can be used. In accordance with various embodiments there is provision in such cases for this additional sensor signal not to have any direct relationship to the function of the electrical parking brake. This prevents the electrical parking brake being able to be released for example accidentally if there is a sensor defect in the braking system.

It may also be seen as an especially advantageous solution according to various embodiments that, after the electrical parking brake is switched back from the service mode into the operational mode, a new calibration of the electrical parking brake is undertaken automatically or manually. During the calibration of the electrical parking brake the braking system is automatically optimized and adapted to the new parameters. Alternatively there is provision for the switching back from service mode into operational mode to be initiated manually with a further predetermined actuation scheme being provided in this case. It may be seen as a very simple solution for the actuation scheme according to an embodiment to be the same as that with which the service mode is initiated.

According to various further embodiments, a motor vehicle may comprise such an electrical parking brake with the control element or the control elements being arranged in or on the motor vehicle.

FIG. 1 shows in a schematic diagram a block diagram of an electrical parking brake 1 according to an embodiment. Electrical parking brakes are used for example on motor vehicles, especially in luxury automobiles, omnibuses and trucks. By contrast with a mechanically-actuatable parking brake which is activated by a hand lever or a foot pedal, with the electrical parking brake the braking mechanism is activated by an electrical signal. In such cases the brake is activated by the driver, as a rule by actuation of a corresponding electrical switch or pushbutton. An actuator then actuates a pull cable or a transmission mechanism by means of a gear, with which the brake linings are applied to the brake drum or brake disk of the parking brake.

The electrical parking brake 1 in accordance with FIG. 1 essentially features a programmable control unit 8. The control unit 8 in this case processes all incoming signals and determines a corresponding control signal for activating an actuator 14 which is connected to the braking mechanism 13. The braking mechanism 13 is coupled mechanically to the individual brakes or the wheels of the motor vehicle to be braked and can thus apply or release the brakes.

Furthermore the electrical parking brake 1 features a control device 9, with which different functions are monitored. The control device 9 outputs corresponding warning signals optically and/or acoustically, as will be explained in greater detail below.

On the input side the electrical parking brake 1 is connected to different motor vehicle sensors or engine sensors 2 through 7. In accordance with FIG. 1 the electrical parking brake 1 is connected on the input side to at least one signal generator 3 which can send one or more motor vehicle signals to the electrical parking brake 1. For example a speed signal can be detected in this way, a door status can be sent, with said signal being used to monitor whether a door of the motor vehicle is opened, a seat status signal can be received etc.

The electrical parking brake 1 is also connected to a brake pedal signal generator 4. The brake pedal signal generator 4 can help to establish whether for example the driver of the motor vehicle has actuated the service brake or not.

The electrical parking brake 1 is likewise connected to a transmission switch signal generator 5. The transmission switch 5 enables switching information to be sent to the electrical parking brake. This information is sent depending on whether a manual transmission or an automatic transmission is built into the vehicle and which setting/gear the transmission is currently selecting.

Furthermore the electrical parking brake 1 is electronically connected to an information generator 6 for the ignition and/or further motor information. This information can for example be used as a basis for establishing whether the motor is running or has been switched off. The switches and generators connected to the input side of the electrical parking brake 1 are optional. In an alternate embodiment there is provision for also connecting further signal generators 7 to the electrical parking brake 1. The further signal generator 7 can for example deliver signals from control units of the motor vehicle or from other vehicle systems such as a radio, a multimedia unit etc.

On the basis of the signals delivered by the signal generators 3 through 7 the control device 9 monitors the function of the vehicle and especially, whether for safety reasons without danger to the vehicle occupants or to a service mechanic, the electrical parking brake 1 can be taken out of operation for maintenance work. This is because, for safety reasons, maintenance work can only be carried out on the electrical parking brake 1 if the motor vehicle is for example prevented from rolling away accidentally and the electrical parking brake is not needed in its operational mode.

As can also be seen from FIG. 1, the control unit 8 determines on the basis of the signals arriving whether the parking brake 15 on the wheel of the motor vehicle with the entire braking mechanism 13 can be switched from the operational mode into the service mode. On switchover into a service mode an actuator 14 which is mechanically coupled to the braking mechanism 13 is electrically activated. The brake mechanism 13 essentially has a gear with which a pull cable may also be actuated, in order to activate the parking brake by pushing force or pulling force or to open it if the load is relieved and if necessary to reduce the transmitted force (not shown in FIG. 1). The actual parking brake 15 consists of brake linings or brake pads which, when the cable is pulled, are pressed against a brake drum or brake disk of the wheel or are pressed onto it by a transmission mechanism and thereby block or reduce a rotational movement of the wheel. During servicing, for example if the brake pads or the brake disk are being renewed, it is necessary however for the parking brake 15 to be moved electrically into a completely opened position. In this so-called emergency release function the load on the brake cable is relieved and no force at all is applied to the cable, so that the mechanical part of the brake cable or the brake cable can be exchanged with exerting any great force and without damage to the braking system. In this completely opened position of the braking system there is the danger however for example of the brake cable, provided it is present coming away from the brake lever and thereby preventing the brake being activated. For safety reasons the various embodiments thus provide for the switchover only to be able to be undertaken in the service mode using a secure diagnostic command. According to various embodiments, this secure diagnostic command is however embodied such that it is possible to switch to the service mode with existing control elements of the motor vehicle and with the aid of a predetermined input scheme. A separate diagnostic device is not required for switching into the service mode and conversely back into the operational mode of the braking system.

On the output side the electrical parking brake 1 is connected to a display 10 on which the functional readiness of the electrical parking brake 1 can be displayed. Furthermore the electrical parking brake 1 is connected to a warning lamp 11 which for example is arranged on the dashboard of the vehicle and outputs a warning signal if the electrical parking brake has been switched to its operational mode for example. In addition to the warning lamp 11 an acoustic signal can also be output. Furthermore a display 12 is provided on which for example the status of the electrical parking brake is output. The display 12 especially shows whether the status of the electrical parking brake 1 is operational and thus that the brake is ready for operation or whether it has been switched into service mode and the parking brake 1 is not ready.

There is provision for adapting the exemplary embodiment shown in FIG. 1 in accordance with the requirements of the motor vehicle manufacturer to the particular circumstances. In particular the control elements 2, 2a can be modified for a specific vehicle. The control elements 2, 2a can be embodied as simple pushbuttons (redundant if required) with a multiple setting (push/pull key), as switches with corresponding levers or such like. Preferably each control element of the motor vehicle can be embodied as a press switch for preparing the switchover function. The switchover is then preferably actually activated with the control element with which the parking brake is normally activated in operational mode.

The functions of the electrical parking brake 1 shown in FIG. 1 will be explained in more detail below on the basis of the flowchart shown in FIG. 2.

As was already mentioned previously, the switchover from operational mode into service mode is undertaken with at least one control element 2, 2a of the motor vehicle according to a predetermined input scheme. No external diagnostic device is required for this purpose. In accordance with FIG. 2 it is assumed that the electrical parking brake 1, in accordance with item 20 (FIG. 2), is in its normal operational mode. In this mode the electrical parking brake 1 is for example able to be activated via the control element 2 (FIG. 1).

The control element 2 is arranged for this purpose within the motor vehicle, for example on a control panel of the dashboard, on the steering wheel or on the transmission tunnel.

FIG. 2 now shows in this exemplary embodiment how the switch can be made from normal operational mode into service mode. In this case a safe combination of control steps with the control elements 2, 2a present in the motor vehicle is employed as the input scheme in order to achieve in the service mode a complete release function for the electrical parking brake. According to an embodiment this release function is to be safely detected as a service function, so that no error can be introduced by it into the braking system. Furthermore the braking system can return automatically to its normal operational mode after the servicing work is completed. Alternatively there is provision for, with a similar input scheme, the electrical parking brake to be able to be switched back into the normal operational mode.

A very simple solution for the switchover into service mode is for the normal control button of the electrical parking brake to be used as the input element. For example the control button of the electrical parking brake can be put into a specific actuation position and must be kept pressed in this position for a defined period. For safety reasons however there is provision for the brake only to be switched into service mode if additional vehicle signals are present. As an alternative or additional solution there is provision for specific patterns for the vehicle signals to be interrogated. For example the number of actuations of control elements 2 within a specific period or at defined intervals can be checked. For reasons of safety there is further provision for this actuation mechanism only to lead to preparation for the switchover into service mode. The actual activation of the service mode is undertaken with the second control element 2a. Only on further actuation of control element 2a or of a further (second) control element is the complete release function for the parking brake actuated. The control element for activating the service mode or the element for releasing the parking brake can be identical. If the second control element 2a, which is preferably the switch for activating the parking brake, in operational mode, or the further control element for the second operating step is not activated within a specific period of time or from a specific vehicle status (for example the motor vehicle was not moved during the activation) or in accordance with a specific control pattern, the system goes back into the normal operational mode.

According to various embodiments, to prepare the switchover into the service mode, the control element 2 may be pressed for 30 seconds for example. In this time the transmission selector for an automatic transmission must be put into the park position and the brake pedal must be pressed three times and subsequently be kept pressed. A subsequent actuation of the control element 2a initiates the switchover into service mode with the complete release function of the electrical parking brake.

There is provision, in order to further increase safety, for yet further signals to be used which are present in the motor vehicle and are not directly connected to the electrical parking brake. To this end signals of control elements or other generator signals, for example signals from the body area, can be included and integrated into the input scheme.

According to various embodiments information to the driver about the assumption of service mode may be generally provided. This can either be done visually with an appropriate lamp or acoustically by corresponding warning signals, warning messages or error lamps. A status signal for this operating state is always to be set, especially if the electrical parking brake is in its service mode.

According to various embodiments, the assumption of normal operational mode is safeguarded for safety reasons to the extent that an accidental operation or a normal operation by the driver cannot lead to the activation of the service mode. This ensures that, especially in the service mode, it is also not possible for any danger to arise to persons working on the electrical parking brake. The switch back from service mode into normal operational mode is thus made preferably with the same procedure as was previously described, if necessary with different control patterns.

Since the parameters of the electrical parking brake can have changed during servicing there is provision for a new calibration before switching the brake back into operating mode. If any errors occur after the calibration these are notified to the driver by a corresponding error message. The electrical parking brake is then not functional.

The function with the previously explained input scheme for switching over into the service mode and conversely for switching back into the normal operational mode will now be further explained with reference to FIG. 2. In item 21 it is asked whether the trigger conditions exist for the switchover into service mode. For example a check is made as to whether the ignition is switched on, the transmission is in the park position and the service brake is pressed. If these conditions do not obtain the system returns to the normal operational mode and optionally indicates this in the display with a corresponding indicator (item 35). If they do, a check is made in item 22 as to whether the control element 2 was pressed for the predetermined period or in accordance with a predetermined input scheme. If this has not been done, the system switches back at item 35 and returns to the normal operational mode. In item 23 a check is made as to whether the expected trigger signals from further control elements or vehicle units exist or exist for a certain period respectively or whether a predetermined control pattern has been adhered to. If not, the system returns to item 35 again and a corresponding warning indicator is output. If these conditions have been met, the electrical parking brake is now prepared for initiation of service mode in item 24.

In item 25 the flow diagram splits into two parts with the two parts being able to be executed in parallel or sequentially. In item 26 the status is displayed on an indicator/display showing that the switching to service mode has been successfully prepared, i.e. all the conditions imposed have been fulfilled. In parallel to this, in position 28 the predetermined interval for the input scheme is checked. If the predetermined interval was exceeded, then at Y in item 27, on the one hand the preparation signal is cancelled and subsequently in position 35 a display indicates that normal operational mode has been assumed again.

If it is not, if the time window in item 28 was adhered to, the program checks (path n, position 29) whether the input scheme was successfully entered for the second control element 2a and the further vehicle parameters were fulfilled. If so, then the parking brake is switched into service mode and the complete release function is started (item 30, 33). In parallel, in item 30, 31 the warning signal is output visually and/or acoustically. In item 32 the program flow is merged again.

In item 34 it is indicated that the electrical parking brake is completely released. This state is retained until the electrical parking brake, preferably using the same procedure as described previously, is switched back automatically or manually into normal operational mode. This especially also takes account of the situations in which the power supply to a control device was disconnected.

The invention is not restricted to the exemplary embodiment shown, but can be varied in numerous ways. There is provision in particular to also use just one control element and/or for combining the switchover in conjunction with the ignition key.

In summary the problems addressed can be described as follows.

With service and repair work on an electrical parking brake (1) of a motor vehicle the problem will arise of a special diagnostic device having to be used for switching into a service mode in which the parking brake (15) can be completely opened in order for example to enable a brake cable to be replaced. Such a diagnostic device is however not always available in specialist workshops. It is thus proposed in accordance with the invention that the switchover into service mode of the electrical parking brake (1) be undertaken with at least one control element (2, 2a) of the motor vehicle. In such a case there is provision, for safety reasons and to avoid any accidental switchover into service mode, for the at least one control element (2, 2a) to have to be actuated in accordance with a predetermined input scheme.

LIST OF REFERENCE SYMBOLS

1 Electrical parking brake
2 First control element
2a Second control element
3 Signal generator
4 Brake pedal generator
5 Transmission switch
6 Information generator
7 further generators
8 Control unit
9 Control device
10 Display/indicator
11 Warning lamp
12 Display
13 Brake mechanism
14 Actuator
15 Parking brake
20-34 Item boxes in FIG. 2
35 Motor vehicle

What is claimed is:

1. An electrical parking brake for a motor vehicle comprising an actuator and a brake mechanism for actuating a parking brake, and in an operational mode the parking brake is operable to be applied or released and in a service mode the parking brake is operable to be put into an opened position, wherein the electrical parking brake is further operable so that the service mode for the electrical parking brake is implemented with at least one control element, and wherein the at least one control element is actuated in accordance with a predetermined input scheme with the aid of a safe combination of input steps.

2. The electrical parking brake according to claim 1, wherein the switchover is prepared with a first control element and the switchover is performed with a second control element.

3. The electrical parking brake according to claim 1, wherein an activation switch of the electrical parking brake, with which the electrical parking brake is actuated in any event, is used as the sole control element.

4. The electrical parking brake according to claim 1, wherein a control device is operable, on activation of the service mode, to detect a manual actuation of the control elements, to store the service mode and to output the status for the activated service mode as at least one of an acoustic and optical warning signal.

5. The electrical parking brake according to claim 1, wherein, as preparation for the activation of the service mode the control element is to be pressed for a minimum time.

6. The electrical parking brake according to claim 1, wherein the switchover into the service mode is only executed if at least one further vehicle signal was detected simultaneously or within a specific time sequence.

7. The electrical parking brake according to claim 1, wherein the at least one control element of the vehicle signal generator for at least one of activating and for deactivating the service mode is to be pressed a number of times.

8. The electrical parking brake according to claim 1, wherein, for at least one of activating and deactivating the service mode, a second control element is actuated according to a second actuation scheme.

9. The electrical parking brake according to claim 7, wherein the electrical parking brake is switched back automatically into the operational mode if the input scheme is not adhered to.

10. The electrical parking brake according to claim 1, wherein, for activating the electrical parking brake a signal of a signal generator of the motor vehicle is evaluated, wherein the signal not having any direct relationship to the function of the electrical parking brake.

11. The electrical parking brake according to claim 1, wherein the switch back into operational mode is undertaken in accordance with at least one of the same input scheme and using the same control elements with which the switchover into service mode was made.

12. The electrical parking brake according to claim 1, wherein, for switching back from service mode into operational mode the further control element of the motor vehicle is to be pressed for at least one of a predetermined minimum time and once or several times.

13. The electrical parking brake according to claim 12, wherein the switch back to operational mode is only undertaken if the transmission of the motor vehicle is set to at least one of idle or to park and a brake pedal for the service brake is pressed at least once and subsequently kept pressed.

14. The electrical parking brake according to claim 1, wherein, before the switch back from service mode into operational mode, or triggered automatically or manually by the switch back, a calibration of the electrical parking brake is carried out in accordance with a predetermined input scheme.

15. A motor vehicle with an electrical parking brake as claimed in claim 1, wherein the at least one control element is arranged in or on the motor vehicle.

16. The electrical parking brake according to claim 2, wherein an activation switch of the electrical parking brake, with which the electrical parking brake is actuated in any event, is used as the second control element.

17. The electrical parking brake according to claim 6, wherein the at least one further vehicle signal is selected from the group consisting of: 'ignition switched on', 'brake pedal is pressed', 'motor vehicle stationary', and 'transmission set to the neutral or the park position'.

18. The electrical parking brake according to claim 1, wherein the at least one control element of the vehicle signal generator for at least one of activating and for deactivating the service mode is to be pressed a number of times within a predetermined time window or at predetermined intervals.

19. The electrical parking brake according to claim 8, wherein, the second actuation scheme comprises at least one of a second time window, an input scheme, and a dependence on an operating state of the motor vehicle.

20. The electrical parking brake according to claim 10, wherein the signal is selected from the group consisting of a signal of a body controller, a signal of a headlamp controller, a signal of a window winder, and a signal of a mirror adjuster.

* * * * *